UNITED STATES PATENT OFFICE.

CHARLES EDOUARD GUILLAUME, OF SÈVRES, FRANCE, ASSIGNOR TO SOCIÉTÉ DES FABRIQUES DE SPIRAUX RÉUNIES, OF LA CHAUX-DE-FONDS, SWITZERLAND.

BALANCE-SPRING HAVING ELASTICITY INCREASING WITH A RISE IN TEMPERATURE.

1,106,206.  Specification of Letters Patent.  Patented Aug. 4, 1914.

No Drawing.  Application filed February 20, 1912.  Serial No. 679,302.

*To all whom it may concern:*

Be it known that I, CHARLES EDOUARD GUILLAUME, doctor of philosophy and assistant director of the International Office of Weights and Measures, a citizen of the Swiss Republic, and resident of Sèvres, Department of Seine-et-Oise, France, have invented new and useful Improvements in Balance-Springs Having Elasticity Increasing with a Rise in Temperature, of which the following is a full, clear, and exact specification.

For some years escapements have been made having balance springs, the elasticity of which increases with the temperature, for the purpose of compensating in great measure the increase of the inertia of the balance wheel as the temperature rises. It has been shown in United States Letters Patent No. 669763, dated March 12th 1901 and British Letters Patent No. 11825 of 1898, that the required increase of elasticity with temperature is exhibited by balance springs made of nickle-steel containing from 27-28 per cent. of nickel or 39-45 per cent. of nickel. The first alloy has alone found application in practice and balance springs thereof are known as "Paul Perret" springs. Accordingly as the compensation is more or less complete these springs are known in the trade as compensated, half-compensated or quarter-compensated; it is to be remarked, however, that in practice none of these balance springs exhibits an absolute and complete compensation. In most cases there is obtained only a partial compensation by the use of these balance springs, the elasticity of which increases with the temperature. It has been found that these nickel-steel balance springs containing 27-28 per cent. of nickel, while giving the aforesaid results, are very soft and in consequence very easily deformed; in other terms their limit of elasticity is very low, indeed so low that they have been compared with leaden springs by watch-makers. The fact is that if they are not made with great care they undergo small permanent deformations when they are made part of an escapement, the balance wheel of which oscillates with considerable amplitude. This is a very serious defect in the regulation, a balance spring which is too soft having always been considered by watchmakers as of inferior quality. This is also the reason why these balance springs have not received a very extended application and have not been used hitherto with success for accurate regulation of time pieces for the purpose of chronometric computations in observatories.

The successful employment of balance springs having an elasticity which increases with the temperature for watches of very good qualities and for scientific instruments of high precision was depending of the manufacture of a balance spring of a high limit of elasticity. Various hardening agents are known in metallurgy, but in the present case not all of them are able to be employed with success, the manufacture of balance springs having to overcome great difficulties for the following reasons: 1. The alloy employed must be able to be laminated and to be drawn to very small diameters. 2. It must be throughout homogeneous, in order that the balance springs made of it may have uniform properties.

After numerous experiences applicant succeeded in the manufacture of an alloy fulfilling all the specified conditions. The principal components of this alloy are in a known manner iron and nickel with convenient additions. Among these additions always are in a known manner small quantities of carbon and of silicon and eventually a larger quantity of manganese. Further essential additions for the present invention are at least two metals of the sixth group of the classification of Mendelejeff, as for instance, chromium and tungsten, chromium and molybdenum, tungsten and molybdenum, chromium, molybdenum and tungsten.

The content of nickel in the alloy is hereby not maintained as hitherto between 27 and 28 per cent., but can vary between 27 and 31% with the quantity of the other elements. Carbon and silicon are employed in quantities of about 0.3 to 0.6 per cent. and manganese in quantities of about 1 to 4 per cent. The other additions which are very important for the invention, are each employed in quantities of 0.2 to 4% and that in such a manner that the total amount of them and of the carbon and silicon or carbon, silicon and manganese is comprised between 3.5 to 10 per cent. of the whole alloy. Such alloy gives a balance spring having elasticity increasing with the temperature and of elastic qualities which with regard to the elastic limit are comparable with those of springs of ordinary steel hardened or tempered.

It has been found that the elastic properties sought (elasticity increasing with the temperature and high elastic limit) depend to a certain extent on the impurities which usually accompany the several elements constituting the alloy used even when these alloys are made from the most pure products obtainable by metallurgy; this dependence is such that two alloys prepared from elements in the same apparent proportions from materials technically pure but of different origin have not exactly the same elastic properties. Even when using the same materials the alloys obtained have not always strictly the same composition and the same elastic properties; this arises from the fact that during the fusion of the alloy certain elements may be more or less oxidized in the crucible and thus pass into the slag; the alloy has not then strictly the composition represented by the proportions of the products used for preparing it. One cannot therefore prescribe strict and absolute proportions and it can only be said that when employing for making the alloys the pure materials obtainable in commerce within the aforesaid limits there is obtained a metal possessing to a more or less perfect degree the desired properties, namely elasticity increasing with rise of temperature and high elastic limit. The proportions to be adopted in making the alloy for the spring vary moreover to a certain extent with the nature of the metals used in the construction of the balance wheel to which the spring is to be applied.

By way of example the composition of an alloy suitable for springs according to this invention is given here:

| | | |
|---|---|---|
| Nickel | 28.5 | parts by weight. |
| Iron | 66.2 | " " " |
| Manganese | 2 | " " " |
| Chromium | 1.5 | " " " |
| Tungsten | 1 | " " " |
| Carbon | 0.5 | " " " |
| Silicon | 0.3 | " " " |

What I claim is:

1. A balance spring of which the elasticity increases with rise of temperature and which has a high elastic limit, consisting of an alloy of iron and nickel containing between 27 and 31 per cent. of nickel and besides of small quantities of carbon and of silicon at least two metals of the sixth group of the classification of Mendelejeff, each of these metals being in such a proportion between 0.2 and 4 per cent. that the total amount of these metals and of the carbon and silicon in the alloy is between 3.5 and 10 per cent. of the whole alloy.

2. A balance spring of which the elasticity increases with rise of temperature and which has a high elastic limit, consisting of an alloy of iron and nickel containing between 27 and 31 per cent. of nickel and besides of small quantities of carbon and of silicon and of 1 to 4 per cent. of manganese at least two metals of the sixth group of the classification of Mendelejeff, each of these two latter metals being in such a proportion between 0.2 and 4 per cent., that the total amount of these metals and of the carbon, manganese and silicon in the alloy is between 3.5 and 10 per cent. of the whole alloy.

3. A balance spring of which the elasticity increases with rise of temperature and which has a high elastic limit, consisting of an alloy of iron and nickel containing between 27 and 31 per cent. of nickel and besides of small quantities of carbon and of silicon, chromium and another metal of the sixth group of the classification of Mendelejeff, each of these two metals of said group being in such a proportion between 0.2 and 4 per cent., that the total amount of these metals and of the carbon and silicon in the alloy is between 3.5 and 10 per cent. of the whole alloy.

4. A balance spring of which the elasticity increases with rise of temperature and which has a high elastic limit, consisting of an alloy of iron and nickel containing between 27 and 31 per cent. of nickel and besides of small quantities of carbon and of silicon and of 1 to 4 per cent. of manganese chromium and another metal of the sixth group of the classification of Mendelejeff, each of these two metals of said group being in such a proportion between 0.2 and 4 per cent., that the total amount of these metals and of the carbon, manganese and silicon in the alloy is between 3.5 and 10 per cent. of the whole alloy.

5. A balance spring of which the elasticity increases with rise of temperature and which has a high elastic limit, consisting of an alloy of iron and nickel containing between 27 and 31 per cent. of nickel and besides of small quantities of carbon and of silicon chromium and tungsten, each of these two latter metals being in such a proportion between 0.2 and 4 per cent,, that the total amount of these metals and of the carbon and silicon in the alloy is between 3.5 and 10 per cent. of the whole alloy.

6. A balance spring of which the elasticity increases with rise of temperature and which has a high elastic limit, consisting of an alloy of iron and nickel containing between 27 and 31 per cent. of nickel and besides of small quantities of carbon and of silicon and of 1 to 4 per cent. of manganese chromium and tungsten, each of these two latter metals being in such a proportion between 0.2 and 4 per cent., that the total amount of these metals and of the carbon, manganese and silicon in the alloy is between 3.5 and 10 per cent. of the whole alloy.

In witness whereof I have hereunto signed my name this 7th day of February 1912, in the presence of two subscribing witnesses.

CHARLES EDOUARD GUILLAUME.

Witnesses:
    CHARLES ALBERT VERILLE,
    BARTLEY F. YOST.